(12) United States Patent
Hiraiwa

(10) Patent No.: US 9,373,013 B2
(45) Date of Patent: Jun. 21, 2016

(54) CARD READER

(71) Applicant: DENSO WAVE INCORPORATED, Chita-gun, Aichi-pref. (JP)

(72) Inventor: Yosuke Hiraiwa, Anjo (JP)

(73) Assignee: DENSO WAVE INCORPORATED, Aichi-Pref. (JP)

( * ) Notice: Subject to any disclaimer, the term of this patent is extended or adjusted under 35 U.S.C. 154(b) by 0 days.

(21) Appl. No.: 14/797,581

(22) Filed: Jul. 13, 2015

(65) Prior Publication Data

US 2016/0042211 A1 Feb. 11, 2016

(30) Foreign Application Priority Data

Aug. 8, 2014 (JP) .................................. 2014-162690

(51) Int. Cl.
*G06K 7/00* (2006.01)
*G06K 7/08* (2006.01)
*G06K 5/00* (2006.01)
*G06K 7/10* (2006.01)

(52) U.S. Cl.
CPC .................................. *G06K 7/10356* (2013.01)

(58) Field of Classification Search
USPC .................. 235/439, 451, 492, 382, 441, 475
See application file for complete search history.

(56) References Cited

U.S. PATENT DOCUMENTS

| | | | | |
|---|---|---|---|---|
| 2004/0037026 A1 | 2/2004 | Mori | | |
| 2005/0077357 A1* | 4/2005 | Roux | ................... | G06K 7/0008 235/451 |
| 2006/0266831 A1* | 11/2006 | Kozlay | ............. | G06K 19/07345 235/451 |
| 2008/0149735 A1* | 6/2008 | Kozlay | ............. | G06K 19/07345 235/492 |
| 2009/0061768 A1* | 3/2009 | Simada | ................ | G06K 7/0008 455/41.1 |
| 2009/0224035 A1* | 9/2009 | Deborgies | .............. | H04K 3/825 235/380 |
| 2011/0241837 A1* | 10/2011 | Suzuki | ................. | G06K 7/0008 340/10.1 |
| 2013/0233924 A1* | 9/2013 | Burns | .................. | G06K 7/0021 235/441 |
| 2014/0145823 A1* | 5/2014 | Aase | ................... | G07C 9/00309 340/5.61 |
| 2015/0227767 A1* | 8/2015 | Sock | .................. | G06K 7/10009 340/10.1 |

FOREIGN PATENT DOCUMENTS

| | | |
|---|---|---|
| JP | 2003-006578 A | 1/2003 |
| JP | 2005-115446 A | 4/2005 |
| JP | 2008-059190 A | 3/2008 |

OTHER PUBLICATIONS

U.S. Appl. No. 14/797,486, filed Jul. 13, 2015 in the name of Hiraiwa.
U.S. Appl. No. 14/797,590, filed Jul. 13, 2015 in the name of Hiraiwa.

* cited by examiner

*Primary Examiner* — Tuyen K Vo
(74) *Attorney, Agent, or Firm* — Oliff PLC

(57) ABSTRACT

A card reader to read information in an integrated circuit (IC) card includes a housing, a first antenna, a control circuit, and a switch unit. The first antenna is disposed inside of the housing to communicate with the IC card. The control circuit communicates with the IC card within a communication range of the first antenna and performs at least a process that acquires data from a memory in the IC card. The switch unit is disposed in the housing. The switch unit includes a radio frequency (RF) tag having a second antenna. The switch unit functions as a switch that performs a predetermined function by causing the RF tag to communicate with the control circuit via the second antenna and the first antenna when a predetermined condition is satisfied.

20 Claims, 7 Drawing Sheets

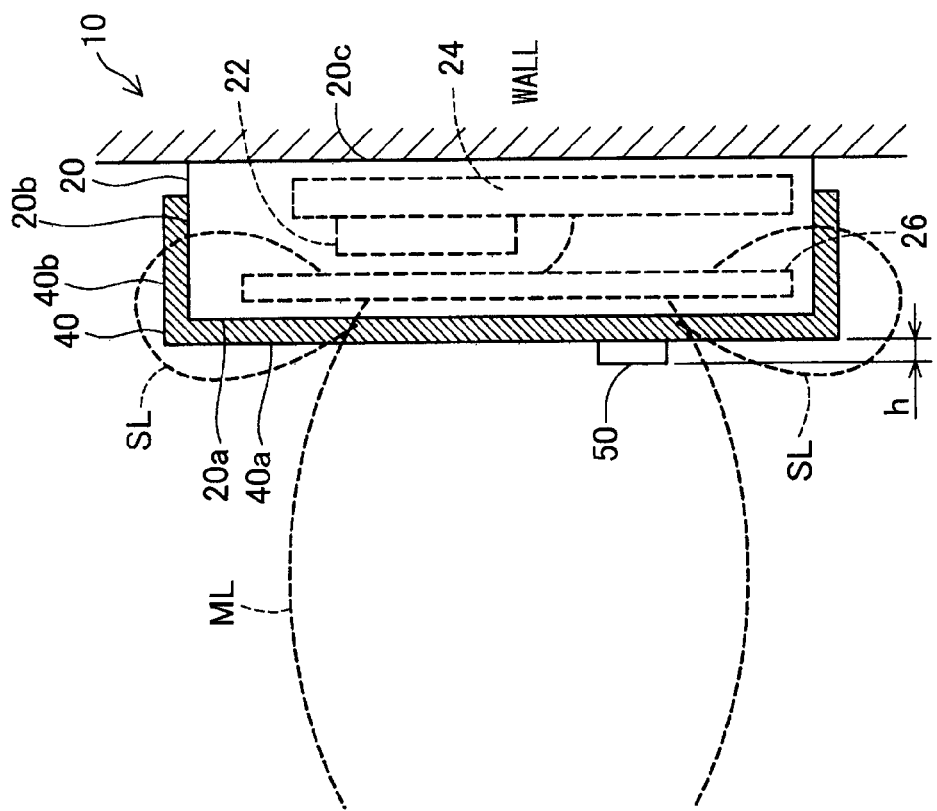
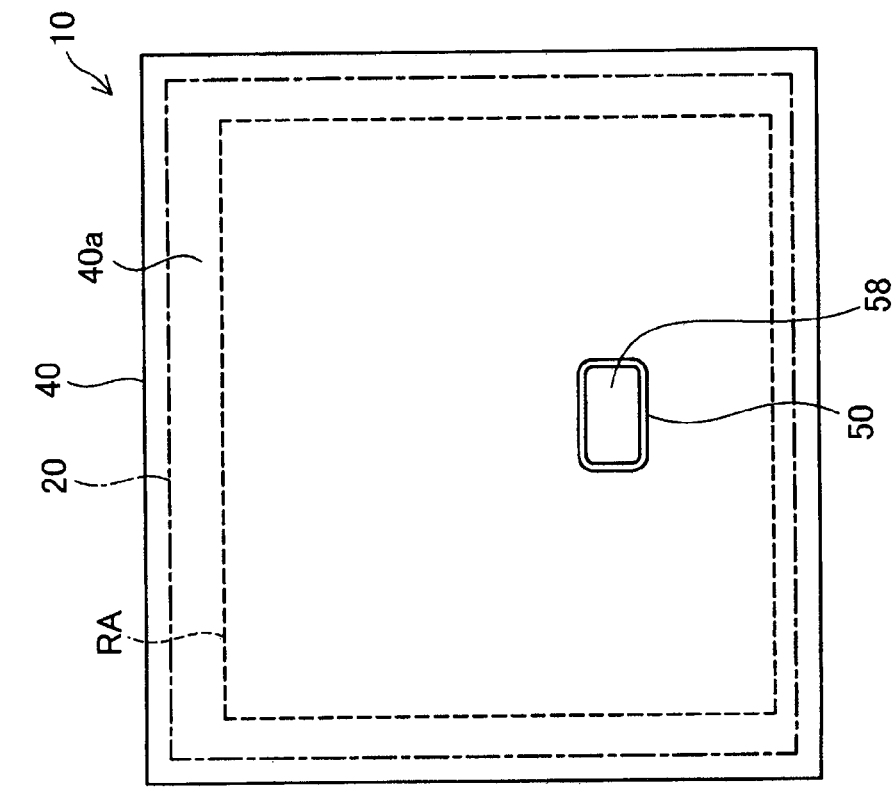
FIG. 1B
FIG. 1A

COMPARATIVE

CARD READER

CROSS REFERENCE TO RELATED APPLICATION

The present application is based on Japanese Patent Application No. 2014-162690 filed on Aug. 8, 2014, the disclosure of which is incorporated herein by reference.

TECHNICAL FIELD

The present disclosure relates to a card reader that reads the information in an integrated circuit (IC) card.

BACKGROUND ART

Patent Literature 1: JP 2003-006578 A

Access control systems are conventionally known to use contactless IC cards for access controls of entering and exiting facilitates, such as offices, warehouses, hospitals (for example, see Patent Literature 1). Such access control systems require each user to only bring his/her contactless IC card in proximity of the card reader installed adjacent to a door of a room to activate wireless communication to immediately identify the user, thereby unlocking the electric lock to permit the user to enter the room.

Some access control systems are further known to install a press-button switch unit on the front face of the card reader. The switch unit is intended to add a function to the card reader, such as a switch for designating a security control associated with security instruments. Each user presses the press-button switch unit and brings the contactless IC card close to the card reader, activating the security control.

Such conventional card readers in some cases respond to the needs of each customer for the usability, such as changing positions of press-button switch units, adding new press-button switch units, thereby involving custom-made design changes. The design changes typically include changes of housing or internal wiring for installing switch units, unfortunately leading to difficulties in re-designing the intensity, waterproofness, and reading performance including reading distance and communication success ratio, against the housing of the reader.

SUMMARY

It is an object of the present disclosure to provide a card reader to solve such difficulties.

An example of the present disclosure provides a card reader that reads information in an integrated circuit (IC) card as follows. The card reader includes a housing, a first antenna, a control circuit, and a switch unit. The first antenna is disposed inside of the housing to communicate with the IC card. The control circuit is to communicate with the IC card within a communication range of the first antenna and perform at least a process that acquires data from a memory in the IC card. The switch unit is provided to the housing and includes a radio frequency (RF) tag having a second antenna; and the switch unit is to function as a switch that performs a predetermined function by causing the RF tag to communicate with the control circuit via the second antenna and the first antenna when a predetermined condition is satisfied.

According to the card reader of this example, attaching of the switch unit to the housing allows the RF tag to communicate with the control circuit, permitting the switch unit to function as a switch achieving a predetermined function. The communication between the switch unit and the control circuit employs the wireless communication using the RF tag. Attaching the switch unit to the housing thus eliminates the needs of changes in the internal wiring or changes in the housing structure, such as boring a hole in the housing for wiring. Therefore, the card reader of this example can facilitate design changes, such as changing attachment positions of switch units or adding anew switch units.

BRIEF DESCRIPTION OF THE DRAWINGS

The above and other objects, features, and advantages of the present disclosure will become more apparent from the following detailed description made with reference to the accompanying drawings. In the drawings:

FIG. 1A is a front view of a card reader according to a first embodiment of the present disclosure;

FIG. 1B is a partial cross-sectional side view of the card reader;

FIG. 4 is a diagram for explaining a principle of the communication between an RF tag and an IC chip with an antenna coil turned on;

DETAILED DESCRIPTION

Figure 2:
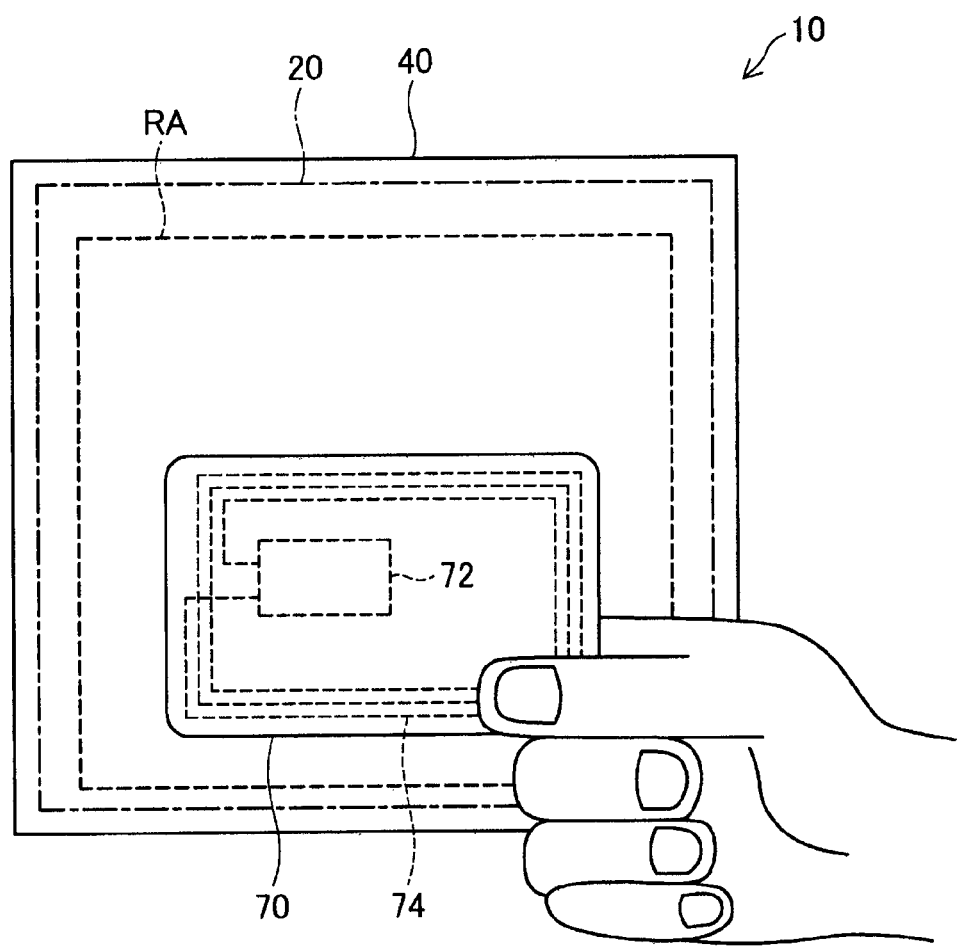
FIG. 2 is a front view of the card reader with an ID card held in contact with a main body of the card reader.

The following will explain embodiments of the present disclosure.

A. First Embodiment

A-1. Configuration

A card reader 10 according to a first embodiment of the present disclosure is illustrated in FIGS. 1A and 1B. FIG. 1A illustrates a front view; FIG. 1B illustrates a partial cross-sectional side view. The card reader 10 is an apparatus for reading information in an identification (ID) card that is unshown. The present embodiment provides the card reader 10 that is included in an access control system managing access controls for entering and exiting offices, for instance. The ID card is a contactless integrated circuit (IC) card, which may be also referred to a non-contact IC card, for personal identification or personal authentication; the ID card is required to be held by office employees in offices, for instance.

As in FIGS. 1A and 1B, the card reader 10 includes a main body 20, a cover 40, and a press-button switch unit 50.

The main body 20 is shaped of a box having a front plate part 20a, a side plate part 20b, and a back plate part 20c. The main body 20 is attached adjacent to a door for entering and exiting an office with the back plate part 20c contacting a wall of the office. The main body 20 contains internally (i) a circuit board 24 mounting with an integrated circuit (IC) chip 22 and (ii) a loop antenna 26 (or antenna coil) connected to the circuit board 24. The IC chip 22 includes a memory that stores data, a CPU (Central Processing Unit), and an RF (Radio Frequency) unit (also referred to as a wireless unit), which modulates and demodulates data, for instance. The loop antenna 26 is connected to the RF unit of the IC chip 22 via the circuit board 24. The loop antenna 26 and the front plate part 20a are arranged as facing each other. This "facing each other" signifies an arrangement permitting (i) the loop plane of the loop antenna 26 and (ii) the front plate part 20a to face each other in parallel or in substantially parallel. Such an arrangement may be alternatively defined as facing each other by forming an angle between the loop plane and the front plate part 20a to be within a range from 135 to 225 degrees.

The cover 40 is attached to the main body 20 so as to cover, of the main body 20, the front plate part 20a and part of the side plate part 20b. The cover 40 has a front face 40a where a reading area RA (see FIG. 1B) for the ID card 70 is formed. This reading area RA is an area corresponding to a communication range of the loop antenna 26; the reading area RA contains, of the loop antenna 26, the main lobe ML and at least part of the side lobe SL. Note that the reading area RA is illustrated only just for explanation; the reading area RA may not be square in practice and may not specify a border between a readable area and a non-readable area certainly. Further, the present embodiment indicates the above arrangement permitting the loop plane of the loop antenna 26 and the front plate part 20a to face each other in parallel or in substantially parallel. However, there is no need to be limited to such arrangement, and another arrangement may be employed as follows. For instance, the loop antenna 26 may be disposed in proximity of the front plate part 20a so as to permit a reading area RA for ID cards to appear at minimum in the front face 40a of the cover 40 facing the front plate part 20a.

A-2. Configuration of ID Card

FIG. 2 is a front view of the card reader 10 with the ID card 70 held in contact with the main body 20 of the card reader 10. The ID card 70 held by a user when entering or exiting a room is caused to be in contact with or close to the reading area RA of the card reader 10. The contactless IC card serving as the ID card 70 contains internally an IC chip 72 and an antenna coil 74 connected to the IC chip 72. The card reader 10 communicates with the ID card 70 having entered the communication range of the loop antenna 26 (see FIG. 1B) via the loop antenna 26 and the antenna coil 74, reading the data from a memory in the IC chip 72 of the ID card 70. The present embodiment, which provides the above reading of the data from the ID card 70, may alternatively provide writing of data into a memory in the IC chip 72 of the ID card 70.

The read data corresponds to an authentication data that authenticates an individual in the present embodiment. The access control system causes the card reader 10 to determine whether the authentication data read from the ID card 70 corresponds to or accords with the data for authentication comparison that is registered previously. When according, the door for entering and exiting the office or room is unlocked.

A-3. Configuration of Press-Button Switch Unit

Returning to FIGS. 1A and 1B, the card reader 10 includes the press-button switch unit 50 as mentioned above. The press-button switch unit 50 is attached, with double-stick tapes, to the front face 40a of the cover 40 within the main lobe ML of the loop antenna 26 in the reading area RA over the front face 40a. Instead of using double-stick tapes, the switch unit 50 may be attached with other means, such as adhesives or fastening bolts. The press-button switch unit 50 is to designate "security" (i.e., security control) associated with security instruments in the present embodiment.

The present embodiment may define a casing portion as including the front plate part 20a, the side plate part 20b, and the back plate part 20c; the casing portion together with the cover 40 may be referred to as a housing. That is, any member added or attached to the casing portion of the main body 20 may be defined as being included in the housing. The present embodiment, which provides the above configuration including the cover 40, may alternatively provide another configuration eliminating the cover 40; namely, the press-button switch unit 50 may be attached directly to the front plate part 20a of the main body 20.

Figure 3:
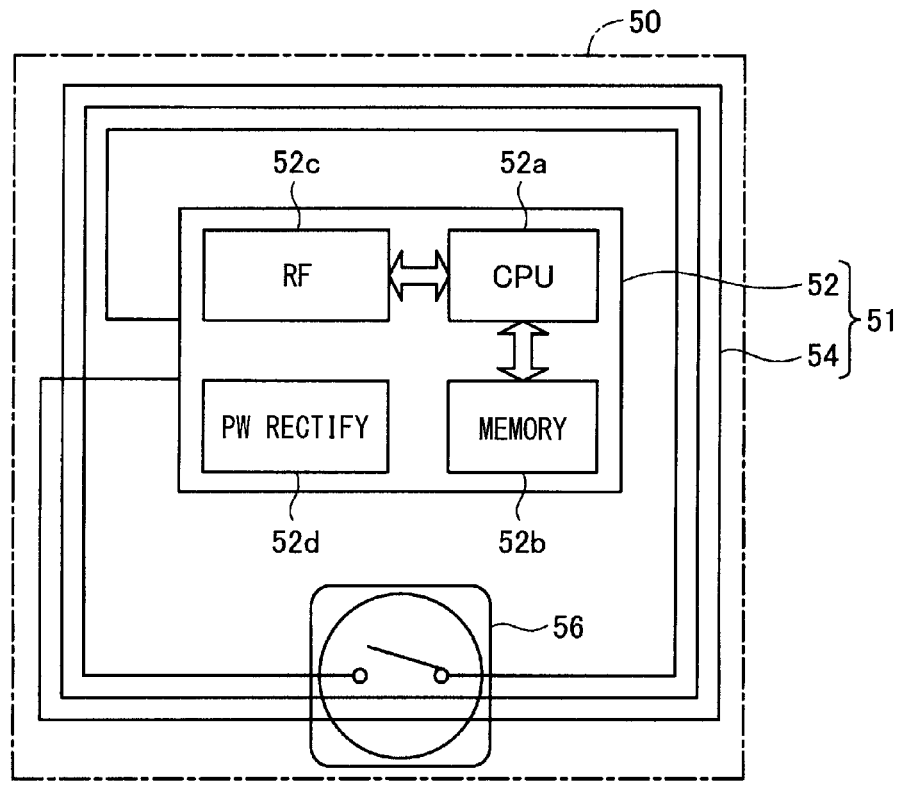
FIG. 3 is a diagram for explaining an internal configuration of a press-button switch unit.

FIG. 3 is a diagram for explaining an internal configuration of the press-button switch unit 50, which contains internally an IC chip 52, an antenna coil 54, and a switch body 56.

The antenna coil 54 is shaped of a planar loop with winding in a coil form in plane, and is connected with the IC chip 52. The antenna coil 54 is also replaceable with any other antennas shaped of various forms, such as rod, patch, slot, swirl, pattern.

The IC chip 52 includes a CPU 52a, a memory 52b, an RF (Radio Frequency) unit 52c, and a power rectification unit 52d. The RF unit 52c, which may be also referred to as a wireless unit, includes a reception portion that demodulates, and a transmission portion that modulates. The power rectification unit 52d rectifies the electric power generated with the electromagnetic induction. The CPU 52a performs processes including a process controlling demodulating and modulation and a process reading tag information from the memory 52b. The memory 52b stores previously the tag information, which includes an identification data identifying an individual, a tag-type data indicating a press-button switch. The IC chip 52 and the antenna coil 54 constitute an RF (Radio Frequency) tag 51.

The switch body 56, which is incorporated in the middle of the antenna coil 54, responds to a press manipulation by the user to a manipulation portion 58 that is shaped of a button (see FIG. 1A) included in the press-button switch unit 50, turning the antenna coil 54 into ON state (with the circuit closed) and turning it into OFF state (with the circuit opened). The switch body 56, which uses a membrane switch in the present embodiment, may alternatively use a reed switch, a micro-switch, a piezo-electric switch, or a conductive rubber switch other than the membrane switch. Note that the manipulation portion 58 has a height h (see FIG. 1B), which is preferably lower; the height h is designed to prevent (i) the damage against the function of a press button and (ii) the interference with the reading of the ID card in contact with or in proximity to the reading area RA. In the press-button switch unit 50, the antenna coil 54 is maintained in OFF state in the initial state and is moved into ON state in response to a press manipulation. Alternatively, the antenna coil 54 may be maintained in ON state in the initial state and is moved into OFF state in response to a press manipulation. The switch body 56, which is incorporated in the middle of the antenna coil 54, may be alternatively incorporated into the IC chip 52 to turn on and off transmissions and receptions of the antenna coil 54.

Figure 4:
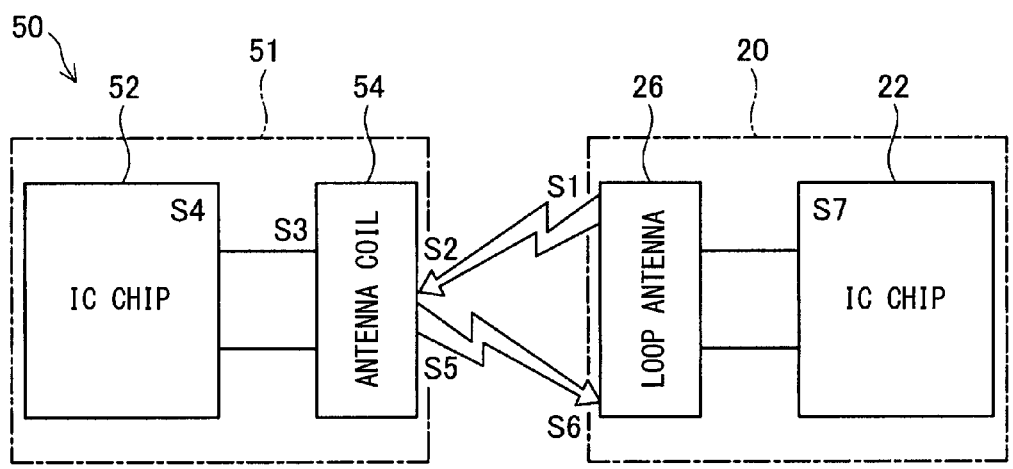

FIG. 4 is a diagram for explaining a principle of the communication between the RF tag 51 and the IC chip 22 with the antenna coil 54 turned on. Note that the present embodiment provides the RF tag 51 being a passive tag that operates on energy source that derives from signals transmitted from the card reader 10. At S1, the IC chip 22 in the main body 20 transmits signals on magnetic field via the loop antenna 26. At S2, the RF tag 51 of the press-button switch unit 50 subsequently receives the magnetic field from the loop antenna 26 via the antenna coil 54. At S3, the antenna coil 54 of the RF tag 51 comes to be in resonance state at the operating frequency (also referred to as a clock frequency) of the loop antenna 28, generating electric power in the antenna coil 54 itself. At S4, the IC chip 52 of the RF tag 51 then operates or activates the CPU 52a and the memory 52b of the IC chip 52 (see FIG. 3) using the generated electric power to execute necessary processes.

At S5, the IC chip 52 puts the data held by the RF tag 51 on the magnetic field to return the data via the antenna coil 54. At S6, the loop antenna 26 in the main body 20 receives the magnetic field from the RF tag 51. At S7, the IC chip 22 in the main body 20 takes out the data from the magnetic field. As explained above, as the antenna coil 54 is turned into ON state, the communication takes place between (i) the RF tag 51 in the press-button switch unit 50 and (ii) the IC chip 22 in the main body 20, permitting data transmissions and data receptions between the RF tag 51 and the IC chip 22 in the main body 20. Note that the present embodiment uses the electromagnetic induction for communicating data or information, but may alternatively use the radio wave or electric waves.

In the present embodiment, the loop antenna 26 may be also referred to as a first antenna; the IC chip 22 may be also referred to as a control circuit; the press-button switch unit 50 may be also referred to as a switch unit; and the antenna coil 54 included in the press-button switch unit 50 may be referred to as a second antenna.

A-4. Tag Information Reading Process

Figure 5:
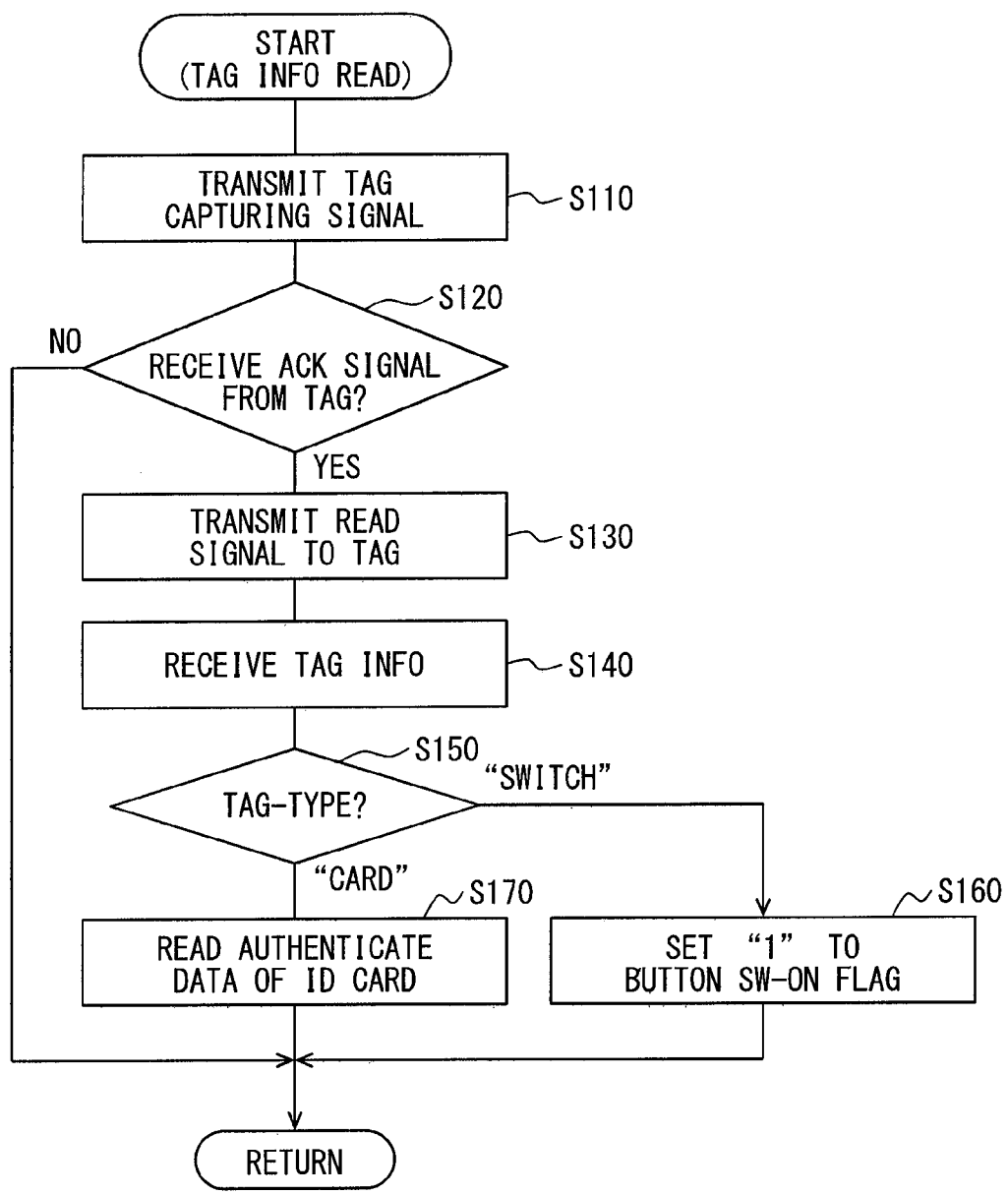
FIG. 5 is a flowchart diagram illustrating a tag information reading process executed by an IC chip in the main body of the card reader.

FIG. 5 is a flowchart diagram illustrating a tag information reading process executed by the IC chip 22 in the main body 20 of the card reader 10. This tag information reading process is repeatedly executed by a CPU included in the IC chip 22 with predetermined time intervals. As starting the process, the CPU transmits a tag capturing signal via the loop antenna 26 in the main body 20 at S110 (S may indicate a section or step). The tag capturing signal is a signal for capturing or recognizing any RF tag entering the communication range of the loop antenna 26, and continues to be transmitted regardless of whether any RF tag is present within a communication range. This RF tag signifies each of general RF tags that include at least (i) the RF tag 51 included in the press-button switch unit 50 and (ii) the contactless IC card serving as the ID card 70 as well. At S110, tag capturing signals are transmitted to determine whether the ID card 70 or the RF tag 51 of the press-button switch unit 50 is present within the communication range of the loop antenna 26.

When a press manipulation is applied to the manipulation portion 58 (see FIGS. 1A and 1B) of the press-button switch unit 50, the antenna coil 54 of the press-button switch unit 50 is turned into an ON state. This enables to detect that the RF tag 51 of the press-button switch unit 50 is present within the communication range of the loop antenna 26 (see FIG. 1B). The communication between the RF tag 51 and the IC chip 22 of the main body 20 thus takes place according to the above-mentioned principle in FIG. 4, permitting the RF tag 51 to return acknowledge signal indicating a reception of the RF capturing signal to the IC chip 22 of the main body 20 via the antenna coil 54 and the loop antenna 26. In contrast, when any press manipulation is not applied to the manipulation portion 58 of the press-button switch unit 50, the antenna coil 54 remains in a non-conductive state to fail to receive the radio waves transmitted from the loop antenna 26. The RF tag 51 thus returns none of acknowledge signals to the IC chip 22.

In addition, when the ID card 70 is in contact with or in proximity to the reading area RA and thus is present within the communication range of the loop antenna 26, the communication between the ID card 70 and the IC chip 22 in the main body 20 takes place, according to the same principle as in FIG. 4. This communication permits the IC chip 72 of the ID card 70 to return an acknowledge signal to the IC chip 22 of the main body 20 via the antenna coil 74 and the loop antenna 26.

Returning to FIG. 5, at S120, the CPU of the IC chip 22 determines whether to receive an acknowledge signal (i.e., ACK signal) from the RF tag 51 of the press-button switch unit 50 or the ID card 70. When determining not receiving an acknowledge signal, the processing proceeds directly to "RETURN," terminating once the tag information reading process.

In contrast, when determining receiving an acknowledge signal at S120, the CPU transmits, at S130, an information read signal to an RF tag, i.e., whichever of the RF tag 51 of the press-button switch unit 50 or the ID card 70 has transmitted the acknowledge signal. Suppose that plural acknowledge signals are determined to be received from plural tags, i.e., from both the ID card 70 and the RF tag 51 of the press-button switch unit 50. In such cases, the RF tag whose acknowledge signal is received earlier than the other is regarded as "the RF tag whose acknowledge signal is received." Alternatively, "the RF tag whose acknowledge signal is received" may be predetermined to be one of them; for instance, the RF tag 51 of the press-button switch unit 50 may be regarded as "the RF tag whose acknowledge signal is received" if acknowledge signals are received from both the RF tag 51 and the ID card 70.

At S140, the CPU performs the process that receives the data serving as the tag information from the RF tag whose acknowledge signal is received. In specific, when the RF tag whose acknowledge signal is received corresponds to the RF tag 51 of the press-button switch unit 50, the CPU of the IC chip 22 receives the identification data and the tag-type data as the tag identification information from the memory 52b of the IC chip 52. In contrast, when the RF tag whose acknowledge signal is received corresponds to the ID card 70, the CPU receives the identification data and the tag-type data from the memory of the IC chip 72.

At S150, the CPU determines whether the tag-type data received at S140 corresponds to the press-button switch unit 50 or the ID card. When determining that the tag-type data corresponds to the press-button switch unit 50, the CPU sets the value of one "1" to the button SW-ON flag that is prepared previously, at S160. The button SW-ON flag, which indicates that the press-button switch unit 50 is turned on, is stored in the memory 52b of the IC chip 52. Note that, at S160, the CPU may further make a determination as to whether the identification data received at S140 accords with a registration data that is registered previously and then sets the value of one "1" to the button SW-ON flag if the determination is affirmed. This can prevent an inappropriate action or injustice, which would replace the press-button switch unit 50 with another button switch.

In contrast, when the tag-type data is determined to correspond to the ID card 70 at S150, the CPU executes a subsequent process which reads the authentication data stored in the ID card 70 at S170. After S160 or S170, the CPU proceeds to "RETURN," terminating once the tag information reading process.

The authentication data read at S170 will be used in a personal identification process executed by another routine. The personal identification process performs an authentication of an individual by comparing the authentication data with the data registered previously, and performs post-authentication process such as unlocking the door when the authentication is satisfied.

In contrast, when the button SW-ON flag is set to the value of one "1" at S160, another routine will perform a process of the transition into security-activated state using the security instruments. Note that the condition where the button SW-ON flag indicates the value of one "1" may allow the direct transition into the security-activated state. The present embodiment, however, allows the transition into the security-activated state when the authentication of the ID card 70 is satisfied within a predetermined period of time since the button SW-ON flag is set to the value of one "1." In contrast, the transition into the security-activated state is disallowed when the authentication of the ID card 70 fails to be satisfied within the predetermined period of time since the button SW-ON flag is set to the value of one "1".

A-5. Advantageous Effects

The first embodiment provides the card reader 10 as follows. The press-button switch unit 50 is attached to the cover 40 of the main body 20 of the card reader 10. This attachment of the press-button switch unit 50 enables the RF tag 51 of the press-button switch unit 50 to communicate with the IC chip 22 of the main body 20, achieving the function as a switch which permits the transition into security-activated state. The above features of the card reader 10 facilitates the design changes that changes the attachment position of the press-button switch unit 50.

Figure 6:
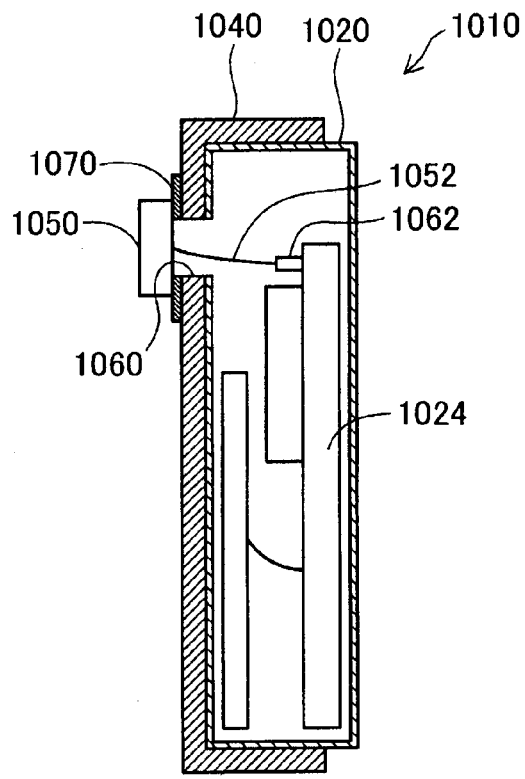
FIG. 6 is a partial cross-sectional side view of a card reader of a comparative example.

FIG. 6 is a partial cross-sectional side view of a card reader 1010 as a comparative example. The card reader 1010 of the comparative example includes a press-button switch unit 1050. This switch unit 1050 is only a press button connected to a circuit board 1024 via a cable 1052, instead of including an RF tag like in the first embodiment of the present disclosure. According to the comparative example, changing the attachment position of the press-button switch unit 1050 to a different position involves changes of positions, such as the position of a hole 1060 for the unit 1050, a position of a cable 1052, the position of a part 1062 connecting the cable 1052 to a circuit board 1024. The comparative example thus fails to facilitate the design changes for the attachment position of the press-button switch unit 1050. By contrast, the card reader 10 of the first embodiment eliminates need of connecting the press-button switch unit 50 to the IC chip 22 of the main body 20 with a cable, requiring none of the above changes of the positions in the comparative example and thus facilitating the design changes to change the attachment position of the press-button switch unit 150.

Further, the card reader 1010 of the comparative example need include a rubber packing 1070 between the press-button switch unit 1050 and a cover 1040 for preventing water entry from the hole 1060. By contrast, the card reader 10 of the present embodiment eliminates the need of boring holes in the cover 40 or the main body 20 in attaching the press-button switch unit 50, thus providing an advantageous effect in that the waterproof measure is easier. Further, the card reader 1010 of the comparative example fails to easily detach the cover 1040 since the press-button switch unit 1050 and the circuit board 1024 are connected with the cable 1052. By contrast, the card reader 10 of the present embodiment provides an advantageous effect in that the cover 40 is easily detached. Further, the card reader 10 of the present embodiment can change the attachment position of the press-button switch unit 50 by replacing a whole cover 40 where a press-button switch unit 50 is attached at a position with another whole cover 40 where another press-button switch unit 50 is attached at another position.

Furthermore, the card reader 10 of the present embodiment can perform easily the design change to additionally attach a new press-button switch unit, for instance, increasing the number of press-button switches from one to two or more.

Furthermore, the card reader 10 of the present embodiment includes the press-button switch unit 50 to be within the reading area RA for the ID card 70, providing the following advantageous effects.

The reading area RA, which allows for reliable communication with the ID card 70, also allows for reliable communication with the press-button switch unit 50 that is arranged also within the reading area RA itself. In addition, when a press manipulation is not applied to the press-button switch unit 50, the antenna coil 54 of the switch unit 50 is maintained at OFF state and thus in the dissonance state at the operating frequency of the loop antenna 26. The antenna coil 54 is thus regarded as being non-existent by the radio waves, providing none of interference against the reading of the ID card 70. Such configuration can provide reliability to both the communication between the ID card 70 and the loop antenna 26 and the communication between the press-button switch unit 50 and the loop antenna 26. Furthermore, the card reader 10 of the present embodiment can have a size smaller than that of the comparative example having a switch unit outside of the reading area indicated in FIG. 6.

B. Second Embodiment

Figure 7B:
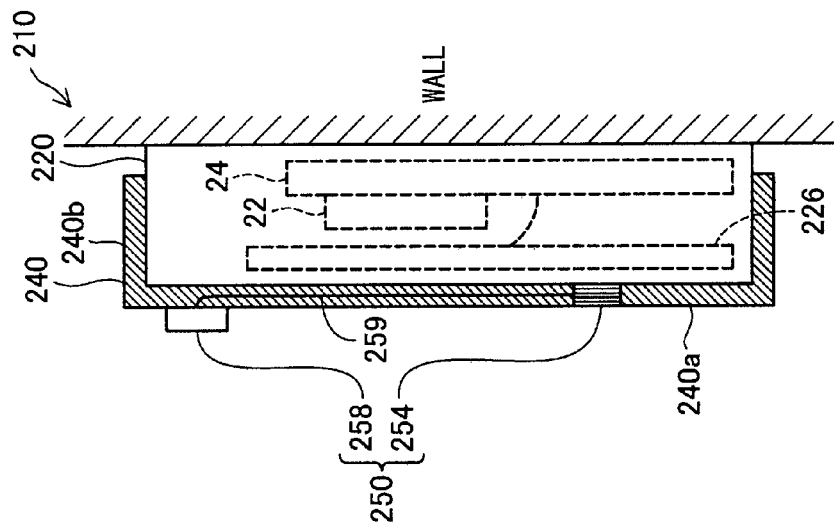
FIG. 7B is a partial cross-sectional side view of the card reader.
Figure 7A:
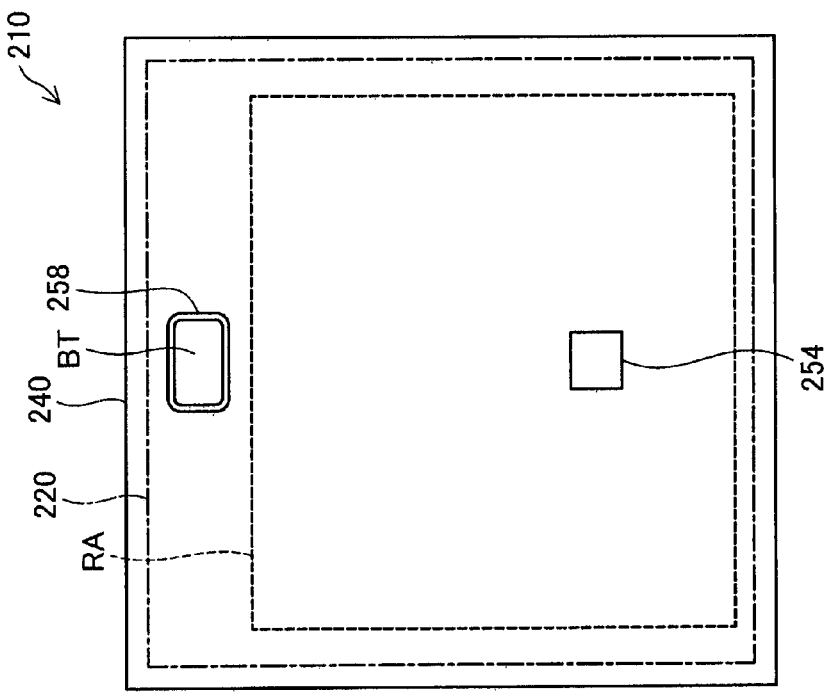
FIG. 7A is a front view of a card reader according to a second embodiment of the present disclosure.

A card reader 210 according to a second embodiment of the present disclosure is illustrated in FIGS. 7A and 7B. FIG. 7A illustrates a front view; FIG. 7B illustrates a partial cross-sectional side view. The card reader 210 of the second embodiment is different from the card reader 10 of the first embodiment in (i) the configuration of the press-button switch unit 250 and (ii) the vertical-directional size of each of the main body 220 and the cover 240. In addition, the configuration of the cover 240 is partially changed according to the difference in the configuration of the press-button switch unit 250.

The press-button switch unit 250, which includes an IC chip, an antenna coil, and a switch body like the first embodiment, is different from the press-button switch unit 50 of the first embodiment in that an antenna coil 254 is arranged to be separate from a main body portion 258 including (i) the IC chip, (ii) the switch body, and (iii) the manipulation portion.

The antenna coil 254 is embedded at a predetermined position of the front face 240a of the cover 240 and electrically connected to the main body portion 258 with an electric wire 259. The predetermined position is within the main lobe of the loop antenna 226 in the reading area RA of the main body 220. The antenna coil 254 included in an RF tag can be made significantly thin; the antenna coil 254 can be thus contained within the thickness of the cover 240.

Although the main body 220 is different from the main body 20 of the first embodiment only in that the vertical-direction size of the housing is larger, the main body 220 includes the same internal components such as the IC chip 22, the circuit board 24, and the loop antenna 26 as those of the main body 20 of the first embodiment. Such configuration of the main body 220 provides its internal upper portion with a space having no components, causing the reading area RA of the antenna 26 to be deviated towards the lower side as indicated in FIGS. 7A and 7B.

The cover 240 is comparable with the cover 40 of the first embodiment in functions, but is different from the cover 40 in that: the size in the vertical direction is longer to meet the size of the main body 220; and the antenna coil 254 and the electric wire 259 are embedded. The main body portion 258 of the switch unit 250 is attached to, of the cover 240, an upper front face that is outside of the reading area RA. That is, in the card reader 210 of the second embodiment, the antenna coil 254 of the press-button switch unit 250 is arranged within the main lobe of the loop antenna 226 in the reading area RA whereas the switch body and IC chip which are the remaining parts of the press-button switch unit 250 are arranged outside of the reading area RA.

The card reader 210 of the second embodiment provides advantageous effects similar to those of the first embodiment. Only attaching the press-button switch unit 250 to the cover 240 of the main body 220 allows for the communication between the press-button switch unit 250 and the main body 220, providing a function as a switch. This configuration facilitates the design changes including the change of the attachment position of the press-button switch unit 250 and adding newly the press-button switch unit, further providing better waterproof measure like the first embodiment. Furthermore, the card reader 210 of the second embodiment can arrange the manipulation portion, which is included in the main body portion 258, of the press-button switch unit 250 manipulated by users to be separate from the reading area RA, increasing the flexibility in the attachment position of the manipulation portion.

Note that the present embodiment, which arranges the main body portion 258 of the press-button switch unit 250 to be outside of the reading area RA on the front face 240a of the cover 240, may alternatively arrange the main body portion 258 on the side face 240b of the cover 240.

C. Third Embodiment

Figure 8:
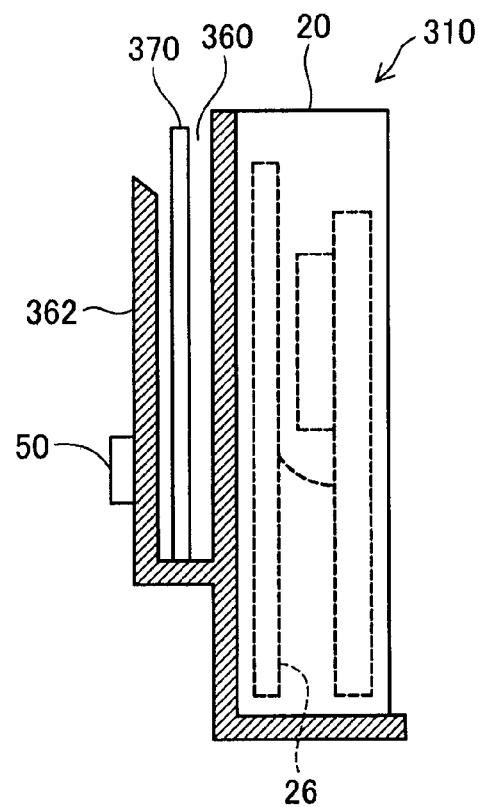
FIG. 8 is a partial cross-sectional side view of a card reader according to a third embodiment of the present disclosure.

FIG. 8 is a partial cross-sectional side view of a card reader 310 according to a third embodiment of the present disclosure. The card reader 310 of the third embodiment, which may permit a user to insert an IC card, includes an electronic money charging unit used for charging an electronic money to an IC card, e.g., in SUICA (Registered trademark). As illustrated, an opening 360 like a pocket receives an IC card 370 inserted therein. A press-button switch unit 50 identical to that of the first embodiment is attached to a wall face 362 in front of the opening 360.

In addition, the card reader 310 includes a main body 20 identical to that of the first embodiment. The present embodiment also attaches the press-button switch unit 50 to be arranged within the main lobe of the loop antenna 26 in the wall face 362. The press-button switch unit 50 is permitted to communicate with the main body 20 while the IC card 370 is inserted.

The card reader 310 of the third embodiment facilitates the design changes including the change of the attachment position of the press-button switch unit 50 and adding newly the press-button switch unit, like the card reader 10 of the first embodiment.

D. Fourth Embodiment

Figure 9:
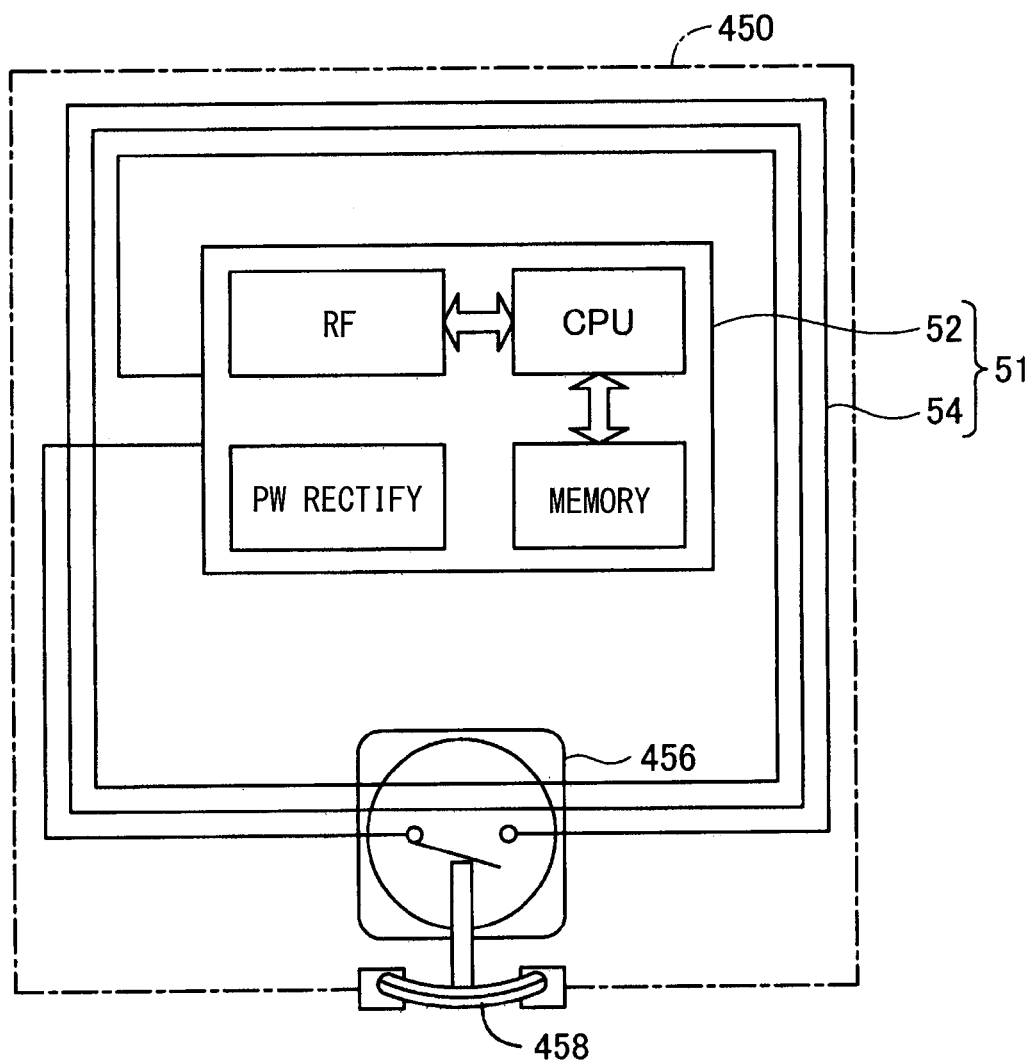
FIG. 9 is a diagram for explaining an internal configuration of a temperature switch unit in a card reader according to a fourth embodiment of the present disclosure.

FIG. 9 is a diagram for explaining an internal configuration of a temperature switch unit 450 included in a card reader according to a fourth embodiment of the present disclosure. The temperature switch unit 450 of the fourth embodiment has a configuration similar to that of the press-button switch unit 50 of the first embodiment. The card reader of the fourth embodiment includes a main body and a cover identical to those of the first embodiment, in addition to the temperature switch unit 450.

The temperature switch unit 450 is different from the press-button switch unit 50 of the first embodiment in that the manipulation portion 58 (see FIG. 1A) is replaced with a bimetal 458, as in FIG. 9. The bimetal 458, which is arranged to be exposed from the front face of the temperature switch unit 450, functions as a temperature detection part. The attachment position of the temperature switch unit 450 to the cover is the same as that of the press-button switch unit 50 in the first embodiment. In addition, the temperature switch unit 450 includes an IC chip 52 and an antenna coil 54 identical to those of the press-button switch unit 50 in the first embodiment, as indicated in FIG. 9. The switch body 456, which is incorporated in the middle of the antenna coil 54, turns on or off the antenna coil 54 in accordance with the shape change of the bimetal 458.

In the card reader of the fourth embodiment, the bimetal 458 deforms to be in a bent state when a temperature around the temperature switch unit 450 becomes a predetermined value or more, turning on the antenna coil 54, whereas the bimetal 458 returns from the bent state when the temperature becomes less than the predetermined value, turning off the antenna coil 54.

According to the card reader of the fourth embodiment, only attaching the temperature switch unit 450 to the cover of the main body permits the communication between the RF tag 51 of the temperature switch unit 450 and the main body of the card reader, allowing the temperature switch unit 450 to function as a switch to inform a fire report system of an occurrence of fire. The card reader of the fourth embodiment can facilitate design changes such as changing the attachment position of the temperature switch unit 45 and adding anew a press-button switch unit. The fourth embodiment, which substitutes the bimetal 458 for the manipulation portion 58 of the first embodiment, may alternatively substitute the bimetal 458 for the manipulation portion of the second or third embodiment.

E. Modifications

The present disclosure, which is not limited to the first to fourth embodiments or modification of those embodiments, may cover various aspects, e.g., the following modifications.

—First Modification

The first to third embodiments, which provide a switch unit to include a manipulation portion manipulated by users, determines that a predetermined condition is satisfied when the manipulation portion is manipulated. In addition, the fourth embodiment, which provides a switch unit includes a temperature detection part, determines that a predetermined condition is satisfied when a detection result of the temperature detection part becomes a predetermined value or greater. The first modification may include the following examples. A first example, which provides a switch unit to include a clock, may determine that a predetermined condition is satisfied when the clock indicates a predetermined time zone. This first example can easily change the design to permit an access using an IC card only for the predetermined time zone. A second example, which provides a switch unit to include a tonometer that only touches a finger to measure, may permit an access using an IC card when the measured value is a predetermined value or less. This second example can easily change the design to permit an access using an IC card when a user has a low blood pressure. The first modification, which provides a switch unit to include a measurement instrument such as a sensor, may determine that a predetermined condition is satisfied when the instrument outputs a predetermined output.

—Second Modification

The first embodiment arranges the press-button switch unit 50 to be within the main lobe ML of the loop antenna 26 in the reading area RA. Alternatively, the press-button switch unit 50 may be arranged to be within the side lobe SL of the loop antenna 26 in the reading area RA. Furthermore, the press-button switch unit 50 may be arranged outside of the reading area RA on the front face 40a or the side face 40b of the cover 40. The press-button switch unit 50 may be arranged at any position of a housing including the cover 40, the position allowing a user to manipulate and simultaneously allowing a communication with the IC chip 22 of the main body 20. The second embodiment arranges the antenna coil 254 of the press-button switch unit 250 to be within the main lobe ML of the loop antenna 226 in the reading area RA. Alternatively, the antenna coil 254 may be arranged to be within the side lobe SL of the loop antenna 226 in the reading area RA. Furthermore, the antenna coil 254 may be arranged outside of the reading area RA on the front face 240a or the side face 240b of the cover 240. In short, the antenna coil 254 of the press-button switch unit 250 may be arranged at any position of a housing including the cover 240, the position allowing a user to manipulate and simultaneously allowing a communication with the IC chip 22 of the main body 20.

—Third Modification

The first to third embodiments provide the press-button switch unit 50, 250, which designates or activate "security," may alternatively inactivate or unlock a security-activated state. The press-button switch unit, which is not limited to "security," may serve as switches for other uses or instructions, such as: instruction for turning on and off devices, such as room lighting; instruction for charging or discharging an electronic money recorded in an IC card; and instruction for returning service points accumulated or recorded in an IC card.

—Fourth Modification

The first to third embodiments, which provide a single press-button switch unit, may alternatively provide a plurality of press-button switch units. Each of those press-button switch units may include an IC chip, an antenna coil, and a switch main body. Alternatively, only one antenna coil and a plurality of combinations, each combination having a single IC chip and a single switch main body, may be provided such that the combinations are electrically connected in parallel to the single antenna coil. Each IC chip stores individually a unique identification data, thus permitting a determination as to which switch main body is manipulated even though the single antenna coil is commonly used for the combinations. In addition, when a plurality of press-button switch units are provided in a card reader, the order of manipulating individually these switch units may be determined so as to permit unlocking only when the determined order of manipulating accords with a predetermined order.

—Fifth Modification

Each manipulation portion, which has a convex shape in the first to third embodiments, may have another shape such as a concave shape having a recess or a flat shape having no protrusion from periphery, or another type such as a touch-sensitive panel. In addition, the manipulation portion may be a toggle switch.

The manipulation portion may thus employ any one from a variety of types of switches.

—Sixth Modification

Each switch unit such as a press-button switch unit or bimetal switch unit, which is fixed to the housing, i.e., either the cover or the main body, using double-stick tapes in the above embodiments, may be alternatively put in a pocket portion that is formed in the housing, facilitating detachment of the switch unit and design changes. In addition, the press-button switch unit or the bimetal switch unit may be embedded in the cover.

—Seventh Modification

The IC card, which serves as an ID card for identifying an individual in each of the above embodiments, may alternatively serve as another type of card, such as a credit card, an automated teller machine (ATM) card, a transportation card, a certification card. In addition, the card reader, which is used for the access control system managing accesses of offices, may be also used for a variety of applications or uses.

—Eighth Modification

The contactless IC card may be any one of at least first to fourth types according to different communication ranges or distances from shorter to longer: the first corresponding to a close-coupling contactless IC card operable in contact with or close to a card reader; the second corresponding to a proximity contactless IC card operable within proximity of a card reader; the third corresponding to a vicinity contactless IC card operable within vicinity of a card reader; and the fourth corresponding to a remote contactless IC card operable remotely from a card reader. Further, the contactless IC card may be any other card operable using wireless communication.

—Ninth Modification

Although the switch unit includes the RF tag that is of a passive type needing none of internal battery, in each of the above embodiments, the switch unit may include alternatively an RF tag that is of an active or semi-active type that needs an internal battery.

—Tenth Modification

The ID card 70, may not be limited to have a card shape, may be replaced by a card-shaped or non-card-shaped hand-held device or terminal that contains internally the IC chip 72 and antenna coil 74 to communicate with the loop antenna 26 of the card reader 10. For instance, the IC chip 72 and antenna coil 74 may be incorporated into a smartphone so as to achieve all the functions of the ID card 70.

An aspect of the present disclosure described herein is set forth in the following clauses.

(1) An aspect of the present disclosure provides a card reader that reads information in an integrated circuit (IC) card as follows. The card reader includes a housing, a first antenna, a control circuit, and a switch unit. The first antenna is disposed inside of the housing to communicate with the IC card. The control circuit is to communicate with the IC card within a communication range of the first antenna and perform at least a process that acquires data from a memory in the IC card. The switch unit is provided to the housing and includes an radio frequency (RF) tag having a second antenna; and the switch unit is to function as a switch that performs a predetermined function by causing the RF tag to communicate with the control circuit via the second antenna and the first antenna when a predetermined condition is satisfied.

(2) In the card reader of the present aspect, the second antenna of the switch unit may be arranged within a main lobe of the first antenna. This configuration can provide the greatest admissible range for installing the second antenna since the main lobe typically provides a radiation angle having the greatest degrees in the outputted magnetic field. The increase in the admissible range for installing an antenna is proportional to the increase in the degree of freedom for the installation, probably canceling the restrictions for installation due to the structure of the housing to facilitate the installation of the switch unit including the second antenna. In addition, the main lobe corresponds to an empty or blank zone for electronic components, arranging the second antenna so as to save the space of the housing as a whole.

(3) In the card reader of the present aspect, the switch unit may activate the RF tag with the electric power generated by the second antenna receiving signals sent from the first antenna. This configuration may employ a passive RF tag, eliminating the need of installing a power source inside of the switch unit and downsizing the switch unit.

(4) In the card reader of the present aspect, the switch unit may be provided such that the second antenna is maintained in a dissonance state at an operating frequency of the first antenna, when the predetermined condition is not satisfied; whereas the second antenna is moved to a resonance state at the operating frequency of the first antenna, when the predetermined condition is satisfied. This configuration maintains the second antenna in a dissonance state at the operating frequency of the first antenna, when the predetermined condition is not satisfied. The second antenna is thus prevented from interfering with reading by the first antenna, permitting the first antenna to perform reliable communication with the IC card. In addition, when the predetermined condition is satisfied, the communication with the switch unit can be also performed with reliability. Both the communication with the IC card and the communication with the switch unit can be performed with reliability.

(5) In the card reader of the present aspect, the switch unit may include a manipulation portion manipulated by users and be provided to determine that the predetermined condition is satisfied when the manipulation portion is manipulated. This configuration can facilitate the design changes against the manipulation portion manipulated by users. The manipulation portion manipulated by users typically need respond to a variety of requests relative to desirable interfaces depending on purposes or installation positions of card readers. Facilitating the design changes can provide advantage effects significantly.

(6) In the card reader of the present aspect, the housing may be provided with a cover, to which the switch unit is attached. This configuration can respond to the design change to change the position of the switch unit by replacing the whole of the cover to a new one, facilitating the design change significantly.

Furthermore, a variety of systems, such as an access control system and a security system may be achieved by including the card reader of the present aspect.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. A card reader to read information in an integrated circuit (IC) card, the card reader comprising:
   a housing;
   a first antenna disposed to be enclosed inside of the housing to communicate with the IC card;
   a control circuit communicating with the IC card within a communication range of the first antenna, the control circuit performing at least a process that acquires data from a memory in the IC card; and
   a switch unit provided to be attached externally to the housing inside of which the first antenna is enclosed, the switch unit including a radio frequency (RF) tag that includes a second antenna, the switch unit functioning as a switch that performs a predetermined function by causing the RF tag to communicate with the control circuit via the second antenna and the first antenna when a predetermined condition is satisfied,
   wherein
   the second antenna is arranged as intervening between (i) the first antenna and (ii) the IC card, when the IC card is placed in the communication range to communicate with the first antenna.

2. The card reader according to claim 1, wherein
of the switch unit, the second antenna at least is arranged within a main lobe of the first antenna.

3. The card reader according to claim 1, wherein
the switch unit activates the RF tag with an electric power generated by the second antenna receiving signals sent from the first antenna.

4. The card reader according to claim 1, wherein:
the second antenna of the switch unit is maintained in a dissonance state at an operating frequency of the first antenna, when the predetermined condition is not satisfied; and
the second antenna is moved to a resonance state at the operating frequency of the first antenna, when the predetermined condition is satisfied.

5. The card reader according to claim 1, wherein:
the switch unit includes a manipulation portion manipulated by a user; and
the switch unit determines that the predetermined condition is satisfied when the manipulation portion is manipulated.

6. The card reader according to claim 1, wherein:
the housing includes a cover; and
the switch unit is attached to the cover.

7. The card reader according to claim 1, wherein:
the housing includes a cover; and
the switch unit is attached to the cover.

8. The card reader according to claim 1, wherein:
the switch unit further includes a switch body in addition to the RF tag including the second antenna, wherein when the predetermined condition of the switch body is satisfied so that the switch unit performs the predetermined function by causing the RF tag to communicate with the control circuit via the second antenna and the first antenna:
   (i) the switch body and (ii) the RF tag including the second antenna are integrally included in the switch unit; and
   the switch unit is attached externally to the housing, causing the switch unit to be arranged as intervening between (i) the first antenna and (ii) the IC card when the IC card is placed in the communication range to communicate with the first antenna.

9. The card reader according to claim 8, wherein:
the housing has outer faces including a front face;
the first antenna is disposed to be enclosed inside of the outer faces of the housing;
the communication range of the first antenna includes a main lobe that is formed over the front face; and
the switch unit is attached externally to the front face of the housing, causing the second antenna to be arranged within the main lobe of the first antenna.

10. The card reader according to claim 8, wherein
the switch unit is provided as a single body component.

11. The card reader according to claim 1, wherein:
the switch unit further includes a manipulation portion in addition to the RF tag including the second antenna, wherein when the manipulation portion is manipulated, the predetermined condition is satisfied so that the switch unit performs the predetermined function by causing the RF tag to communicate with the control circuit via the second antenna and the first antenna;

(i) the manipulation portion and (ii) the RF tag including the second antenna are internally contained in the switch unit; and the switch unit is attached externally to the housing, causing the switch unit to be arranged as intervening between (i) the first antenna and (ii) the IC card when the IC card is placed in the communication range to communicate with the first antenna.

12. The card reader according to claim 11, wherein:
the housing has outer faces including a front face;
the first antenna is disposed to be enclosed inside of the outer faces of the housing;
the communication range of the first antenna includes a main lobe that is formed over the front face; and
the switch unit is attached externally to the front face of the housing, causing the second antenna to be arranged within the main lobe of the first antenna.

13. The card reader according to claim 11, wherein:
the switch unit is provided as a single body component.

14. The card reader according to claim 1, wherein:
the switch unit further includes a temperature switch body in addition to the RF tag including the second antenna, causing the switch unit to be provided as a temperature switch unit, wherein when a temperature around the temperature switch body becomes a predetermined value, the predetermined condition is satisfied so that the temperature switch unit performs the predetermined function by causing the RF tag to communicate with the control circuit via the second antenna and the first antenna;
(i) the temperature switch body and (ii) the RF tag including the second antenna are integrally included in the temperature switch unit; and
the temperature switch unit is attached externally to the housing, causing the temperature switch unit to be arranged as intervening between (i) the first antenna and (ii) the IC card when the IC card is placed in the communication range to communicate with the first antenna.

15. The card reader according to claim 14, wherein:
the housing has outer faces including a front face;
the first antenna is disposed to be enclosed inside of the outer faces of the housing;
the communication range of the first antenna includes a main lobe that is formed over the front face; and
the temperature switch unit is attached externally to the front face of the housing, causing the second antenna of the temperature switch unit to be arranged within the main lobe of the first antenna.

16. The card reader according to claim 14, wherein:
the temperature switch unit is provided as a single body component.

17. A card reader to read information in an integrated circuit (IC) card, the card reader comprising:
a main body;
a first antenna disposed to be enclosed inside of the main body to communicate with the IC card;
a control circuit communicating with the IC card within a communication range of the first antenna, the control circuit performing at least a process that acquires data from a memory in the IC card;
a cover, attached externally to the main body, inside of which the first antenna is enclosed; and
a switch unit including:
a radio frequency (RF) tag that includes a second antenna, and
a manipulation portion that is manipulated by a user, the manipulation portion electrically connected with the RF tag,
the switch unit functioning as a switch that performs a predetermined function by causing the RF tag to communicate with the control circuit via the second antenna and the first antenna when the manipulation portion is manipulated,
wherein:
the manipulation portion is attached externally to a front face of the cover so that the cover is disposed as intervening between (i) the main body and (ii) the manipulation portion; and
the second antenna is provided in the cover to be arranged as intervening between (i) the first antenna and (ii) an antenna coil of the IC card when the IC card is placed in the communication range to communicate with the first antenna.

18. The card reader according to claim 17, wherein:
the communication range of the first antenna includes a main lobe that is formed through the cover, causing the second antenna to be arranged within the main lobe.

19. A card reader to read information in an integrated circuit (IC) card, the card reader comprising:
a main body;
a first antenna disposed to be enclosed inside of the main body to communicate with the IC card;
a control circuit communicating with the IC card within a communication range of the first antenna, the control circuit performing at least a process that acquires data from a memory in the IC card;
a cover attached externally to the main body inside of which the first antenna is enclosed, the cover providing an opening to hold the IC card that is inserted to communicate with the first antenna; and
a switch unit internally containing a radio frequency (RF) tag that includes a second antenna, the switch unit functioning as a switch that performs a predetermined function by causing the RF tag to communicate with the control circuit via the second antenna and the first antenna when a predetermined condition is satisfied,
wherein:
the switch unit is provided to be attached externally to a front wall face of the cover, causing the cover to be disposed as intervening between (i) the main body and (ii) the switch unit, whereby when the IC card is inserted in the opening to communicate with the first antenna, an antenna coil of the IC card is arranged as intervening between (i) the second antenna and (ii) the first antenna.

20. The card reader according to claim 19, wherein:
the communication range of the first antenna includes a main lobe that is formed through the cover, so that the second antenna of the switch unit is arranged within the main lobe and the antenna coil of the IC card inserted in the opening is arranged within the main lobe.

* * * * *